Sept. 4, 1923.  1,466,772
W. L. TRAUTNER ET AL
OIL RETAINER
Filed Feb. 10, 1922
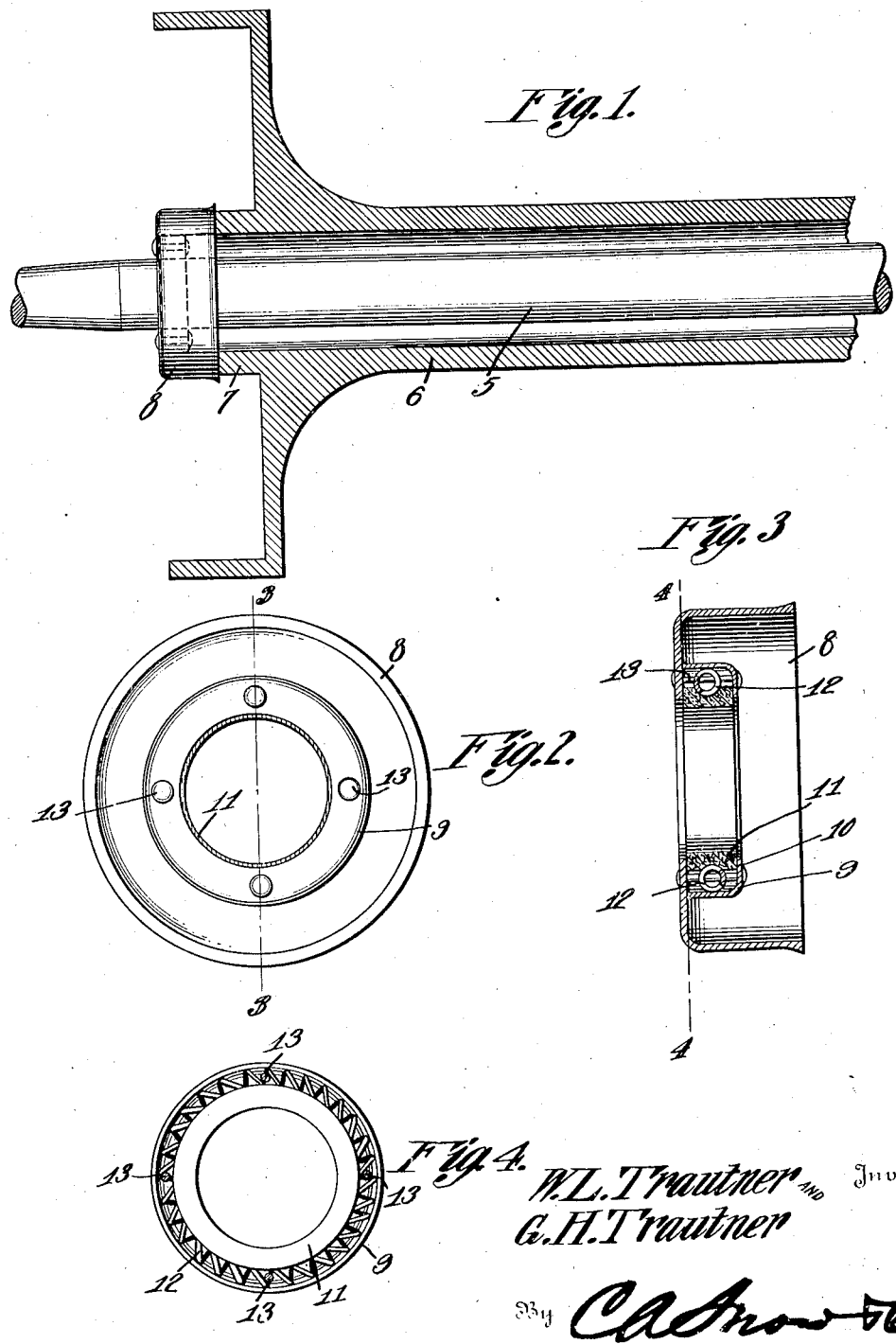

Patented Sept. 4, 1923.

1,466,772

UNITED STATES PATENT OFFICE.

WILLIAM L. TRAUTNER AND GEORGE H. TRAUTNER, OF ST. PAUL, MINNESOTA.

OIL RETAINER.

Application filed February 10, 1922. Serial No. 535,574.

*To all whom it may concern:*

Be it known that we, WILLIAM L. TRAUTNER and GEORGE H. TRAUTNER, citizens of the United States, residing at St. Paul, in the county of Ramsey, State of Minnesota, have invented a new and useful Oil Retainer, of which the following is a specification.

This invention relates to automobile constructions, and more particularly to means employed in connection with the rear axle to prevent the grease or lubricant contained in the differential housing from working through the hub of the wheel at a point where the same contacts with the outer end of the axle housing.

Another object of the invention is to provide a device of this character which will automatically adjust itself to the axle supporting the same, to compensate for wear of the felt washer, forming a part of the device.

A still further object of the invention is to provide a retainer which may be readily and easily applied to an axle, eliminating the necessity of making extensive alterations to apply the device.

With the foregoing and other objects in view which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

Referring to the drawing:—

Figure 1 is a sectional view through an axle housing, and disclosing an axle as supported therein, the same being supplied with a grease retainer constructed in accordance with the present invention.

Figure 2 is an end elevational view of the device.

Figure 3 is a sectional view taken on line 3—3 of Figure 2.

Figure 4 is a sectional view taken on line 4—4 of Figure 3.

Referring to the drawing in detail, Figure 1 of the drawing illustrates the invention as applied to an axle, which axle is indicated at 5 and supported within the usual axle housing 6, which is of the well known construction, the same being formed with an extension 7.

The device forming the essence of the invention, is secured within the usual housing cap which is indicated at 8, and as shown, the device comprises the body portion 9 formed with an inwardly extending flange 10, which flange 10 cooperates with the housing cap 8 to secure the washer 11 therein, the washer 11 being formed of felt or other fibrous material to closely engage the axle on which the same is positioned.

This washer 10 is formed with a circumferential groove to accommodate the coiled spring 12, which encircles the washer 11 to urge the same into close engagement with the axle with the result that when the washer becomes slightly worn, the coiled spring will by its action, hold the washer into close engagement with the axle.

The body portion 9 is secured to the housing cap 8 as by means of the rivets 13, which pass through suitable openings in the housing cap and body portion 9. These rivets also extend between the coils of the spring and restrict movement of the spring circumferentially of the washer.

From the foregoing it will be seen that a pipe connection between the washer and axle 5, is insured at all times, any possibility of the grease working laterally from the axle housing, being eliminated.

Having thus described the invention, what is claimed as new is:—

In combination with an axle housing, axle supported therein, and housing cap supported at one end of the axle housing, a body portion secured to the housing cap and having an inwardly extending flange, a flexible washer positioned between the flange of the body portion and one wall of the housing cap to support the washer, a coiled spring embracing the washer and normally urging the same into engagement with the axle, and means for securing the body portion within the housing cap.

In testimony that we claim the foregoing as our own, we have hereto affixed our signatures in the presence of two witnesses.

WILLIAM L. TRAUTNER.
GEORGE H. TRAUTNER.

Witnesses:
F. R. WARD,
M. V. MULLEN.